(12) United States Patent
Pan et al.

(10) Patent No.: US 11,453,210 B2
(45) Date of Patent: Sep. 27, 2022

(54) AUTOMATIC LAMINATING MACHINE

(71) Applicant: Forta Electronics Co., Ltd., Guangdong (CN)

(72) Inventors: Guofeng Pan, Guangdong (CN); Zhengzhong Gao, Guangdong (CN)

(73) Assignee: FORTA ELECTRONICS CO., LTD.

( * ) Notice: Subject to any disclaimer, the term of this patent is extended or adjusted under 35 U.S.C. 154(b) by 212 days.

(21) Appl. No.: 16/728,422

(22) Filed: Dec. 27, 2019

(65) Prior Publication Data
US 2020/0307172 A1     Oct. 1, 2020

(30) Foreign Application Priority Data

Mar. 28, 2019   (CN) .......................... 201910243514.2

(51) Int. Cl.
*B32B 37/00*      (2006.01)
*B32B 37/20*      (2006.01)

(52) U.S. Cl.
CPC .......... *B32B 37/0053* (2013.01); *B32B 37/20* (2013.01); *B32B 37/0046* (2013.01); *B32B 2037/0061* (2013.01); *B32B 2309/72* (2013.01); *B65H 2402/46* (2013.01)

(58) Field of Classification Search
CPC ................ B32B 37/0053; B32B 37/20; B32B 2037/0061; B32B 2309/72
See application file for complete search history.

(56) References Cited

U.S. PATENT DOCUMENTS 4,284,269 A * 8/1981 Ignatjev ............... B65H 3/5284
271/122
6,059,281 A    5/2000 Nakamura et al.

FOREIGN PATENT DOCUMENTS

JP      2017141110 A      8/2017

OTHER PUBLICATIONS

European Search Report for corresponding EP Application No. 19219896.8, dated Jul. 13, 2020, 8 pages.

* cited by examiner

*Primary Examiner* — Linda L Gray
(74) *Attorney, Agent, or Firm* — Wood, Phillips, Katz, Clark & Mortimer

(57) ABSTRACT

Provided is an automatic laminating machine, including a supporting plate assembly, a case, a limiting assembly, a film separation assembly, and an input roller assembly. A lower end of the supporting plate assembly extends into and is rotatably connected inside the case. The limiting assembly and the input roller assembly are rotatably connected inside the case. The film separation assembly is arranged inside the case, and located below the input roller assembly. One end of the limiting assembly is rotatably connected to the supporting plate assembly.

8 Claims, 7 Drawing Sheets

AUTOMATIC LAMINATING MACHINE

CROSS-REFERENCES TO RELATED APPLICATIONS

This application claims priority to Chinese patent application No. 201910243514.2 filed on Mar. 28, 2019, disclosure of which is incorporated herein by reference in its entirety.

TECHNICAL FIELD

The present disclosure relates to the field of laminating machines, in particular, to an automatic laminating machine.

BACKGROUND

During the operation, the traditional laminating machine needs the staff to place each film on a supporting plate of the laminating machine. The lamination can be started only when the film smoothly enters a roller at an input inlet. During the whole lamination process, the staff cannot leave, and errors are easily produced due to manual placement, leading to a high scrap rate. Over time, the work efficiency is greatly affected, the cost is difficult to control, and the labor expenditure may not be effectively improved.

SUMMARY

Based on the above, the present disclosure provides an automatic laminating machine, to solve the problem of the laminating machine in the related art being low in efficiency.

In order to achieve this object, the present disclosure provides an automatic laminating machine as follows.

The automatic laminating machine includes a supporting plate assembly, a case, a limiting assembly, a film separation assembly, and an input roller assembly. A lower end of the supporting plate assembly extends into and is rotatably connected inside the case. The limiting assembly and the input roller assembly are rotatably connected inside the case. The film separation assembly is arranged inside the case, and located below the input roller assembly. One end of the limiting assembly is rotatably connected to the supporting plate assembly.

In one embodiment, the input roller assembly includes a rolling shaft, a roller bracket, a roller, and a cam. Two ends of the rolling shaft are rotatably connected to the case. The roller bracket is fixed on a middle part of the rolling shaft. A roller is sleeved on the roller bracket, and two ends of the rolling shaft are respectively provided with the cam.

In one embodiment, the film separation assembly includes a film separation wheel, a bracket, and an elastic member. The bracket is arranged on the case. The film separation wheel is rotatably connected to the bracket, and located right below the roller. The elastic member is fixed below the bracket.

In one embodiment, the limiting assembly includes a rotating shaft, a limiting block, a driven flywheel, and a return spring. Two ends of the rotating shaft are rotatably connected to an inner side wall of the case. The return spring and the driven flywheel are arranged on one end of the rotating shaft connected to the case, and the return spring is located on an outer side of the driven flywheel. Two ends of the roller are respectively provided with the limiting block.

In one embodiment, the limiting block has a sectorial shape. A tail end of the limiting block is sleeved on the rotating shaft. In condition that a head end of the limiting block moves to a high point, the head end of the limiting block is located within a circumference of the film separation wheel.

In one embodiment, the supporting plate assembly includes a rotating supporting plate, a bearing plate, and a supporting spring. A lower end of the rotating supporting plate extends into the case, and an upper end of the rotating supporting plate is rotatably connected to the case. The bearing plate is fixed on a front end of the case. The supporting spring is fixed below the rotating supporting plate.

In one embodiment, the rotating supporting plate includes a bottom plate and two side baffles. A front end of an outer side of each side baffle is provided with a rotating block rotatably connected to the case. The bottom plate is elastically connected to the case through the supporting spring.

In one embodiment, the cam includes a first cam and a second cam. In condition that the first cam is rotated to a low point, the first cam is squeezed and in contact with a driven flywheel. And in condition that the second cam is rotated to the low point, the second cam is squeezed and in contact with a side baffle.

In one embodiment, a laminating assembly is arranged inside the case. The laminating assembly includes a transmission channel, a preheating assembly, and a film pressing assembly. Upper and lower sides of a front end of the transmission channel are respectively provided with the preheating assembly. Upper and lower sides of a tail end of the transmission channel are respectively provided with the film pressing assembly.

In one embodiment, a detection device is arranged inside the case, and located between the input roller assembly and the laminating assembly.

The beneficial effects of the present disclosure are as follows.

For the automatic laminating machine provided by the present disclosure, the input roller assembly inside the laminating machine is adjusted, and the limiting assembly and the film separation assembly are added and designed. The uppermost film can enter the case to be processed through the film separation assembly and the input roller assembly, and the lower films can be limited from entering the input roller assembly through the limiting assembly, thereby achieving the automatic layering and entering of the film. And the automatic laminating machine is stable in performance, high in efficiency, and relatively high in rate of qualified products.

BRIEF DESCRIPTION OF DRAWINGS

In order to more clearly illustrate the embodiments of the present disclosure, the drawings used in the description of the embodiments of the present disclosure are briefly introduced as follows.

DETAILED DESCRIPTION

To make the present disclosure clearer, hereinafter the embodiments of the present disclosure will be further described in detail in conjunction with accompanying drawings.

Figure 1:
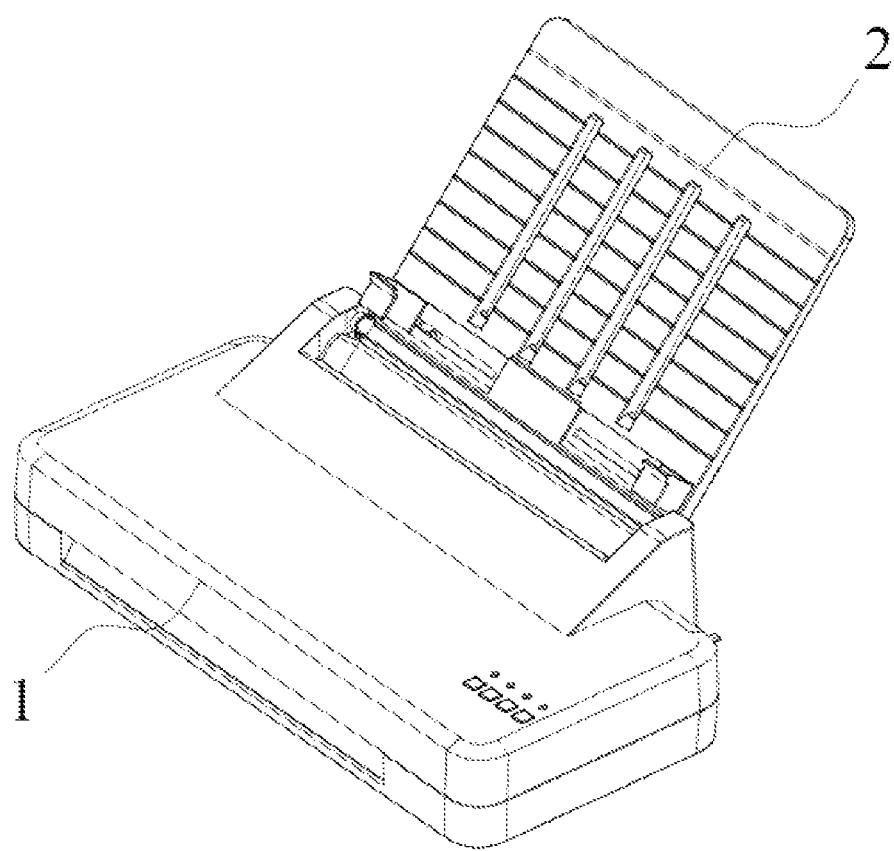
FIG. 1 is a schematic diagram illustrating an automatic laminating machine provided by the embodiments of the present disclosure.
Figure 2:
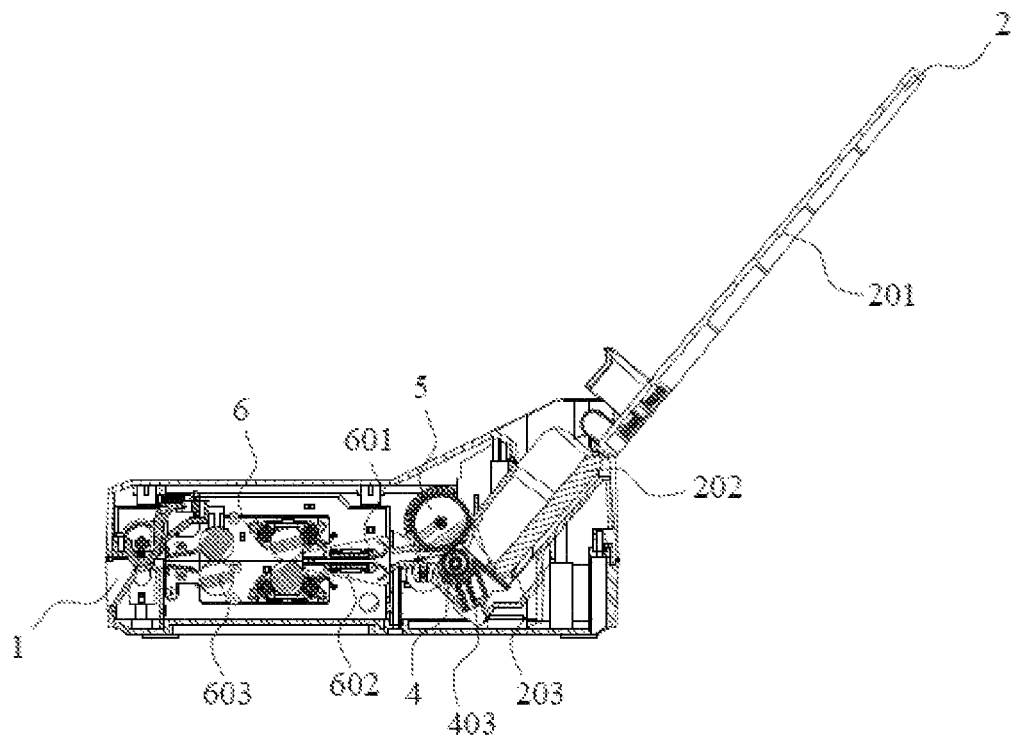
FIG. 2 is a cross-sectional view illustrating an automatic laminating machine provided by the embodiments of the present disclosure.
Figure 3:
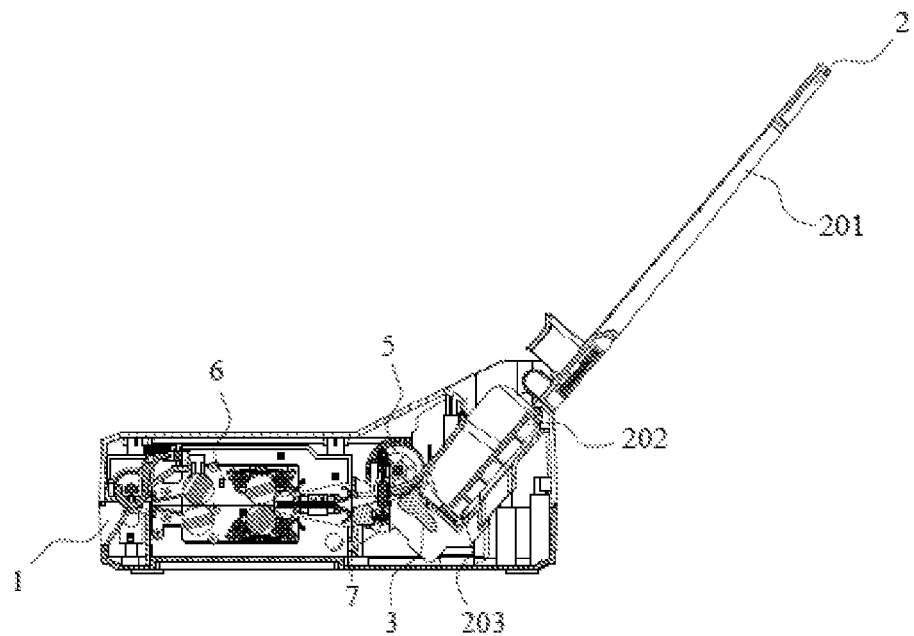
FIG. 3 is a schematic diagram illustrating an automatic laminating machine in a limited state provided by the embodiments of the present disclosure.
Figure 4:
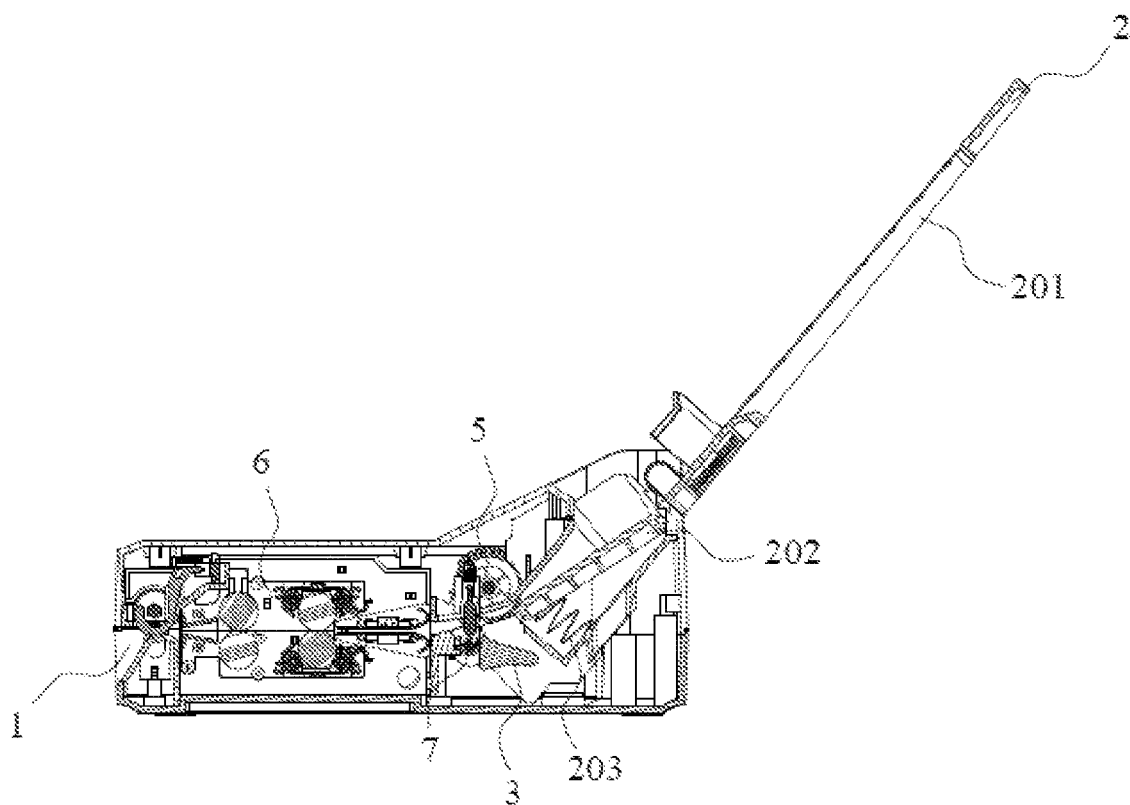
FIG. 4 is a schematic diagram illustrating an automatic laminating machine in a non-limited state provided by the embodiments of the present disclosure.
Figure 5:
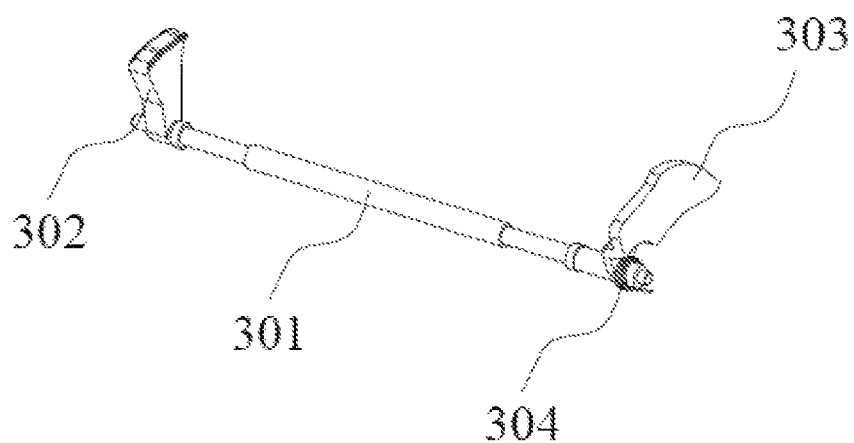
FIG. 5 is a schematic diagram illustrating a limiting assembly provided by the embodiments of the present disclosure.
Figure 6:
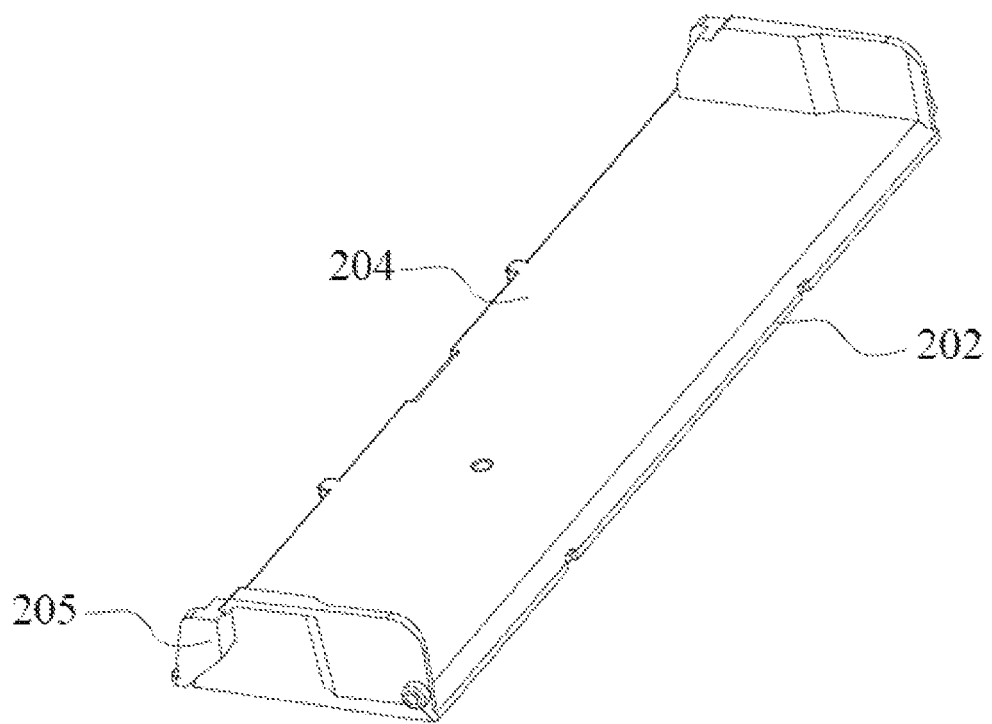
FIG. 6 is a schematic diagram illustrating a rotating supporting plate provided by the embodiments of the present disclosure.
Figure 7:
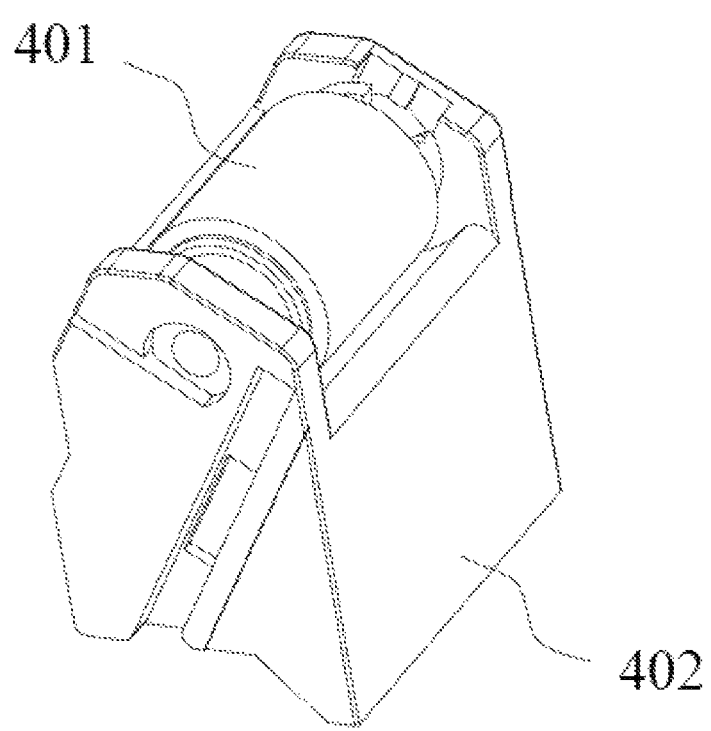
FIG. 7 is a schematic diagram illustrating a film separation assembly provided by the embodiments of the present disclosure.
Figure 8:
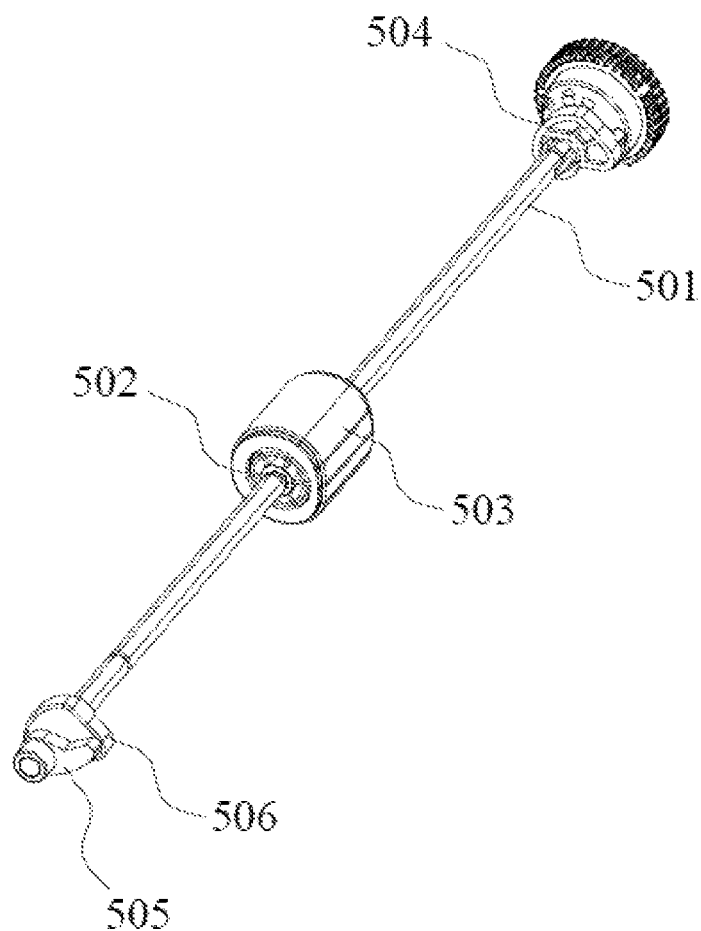
FIG. 8 is a schematic diagram illustrating an input roller assembly provided by the embodiments of the present disclosure.
Figure 9:
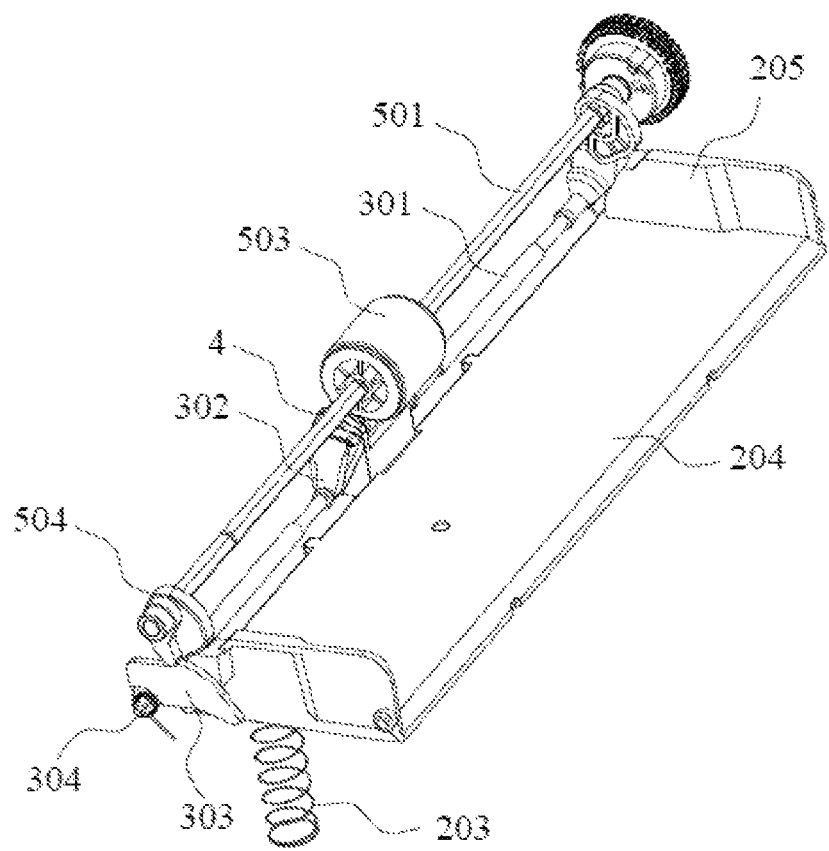
FIG. 9 is a connectional schematic diagram illustrating an input roller assembly, a limiting assembly, a film separation assembly, and a rotating supporting plate provided by the embodiments of the present disclosure.

As shown in FIG. 1 to FIG. 9, provided is an automatic laminating machine, including a case 1 and a supporting plate assembly 2. A lower end of the supporting plate assembly 2 extends into and is rotatably connected inside the case 1. In the present embodiment, the laminating machine further includes a limiting assembly 3, a film separation assembly 4 and an input roller assembly 5. The limiting assembly 3 and the input roller assembly 5 are rotatably connected inside the case 1. The film separation assembly 4 is arranged inside the case 1, and located below the input roller assembly 5. Two ends of the limiting assembly 3 are rotatably connected to an inner wall of the case 1. An uppermost film is firstly sent into the case 1 to be processed through the film separation assembly 4 and the input roller assembly 5, and then a lower film is limited from entering the case 1 through the limiting assembly 3. Repeatedly, the automatic processing of the film is completed.

In the present embodiment, the input roller assembly 5 includes a rolling shaft 501, a roller bracket 502, a roller 503 and a cam 504. Two ends of the rolling shaft 501 are connected to the case 1. The roller bracket 502 is fixed on a middle part of the rolling shaft 501. The roller 503 is sleeved on the roller bracket 502 so as to facilitate the disassembly and installation of the roller 503. Two cams 504 are provided, which are fixed on the two ends of the rolling shaft 501 respectively. And the two cams are oriented in a same direction. The film separation assembly 4 is located directly below the roller 503. The film separation assembly 4 includes a film separation wheel 401, a bracket 402 and an elastic member 403. The bracket 402 is arranged on the case 1. The film separation wheel 401 is rotatably connected to an upper end of the bracket 402. The upper end of the bracket 402 is hollowed out and configured to install the film separation wheel 401. The elastic member 403 is arranged below the bracket 402, and a lower end of the elastic member 403 is connected to the case 1. Each of two ends of the film separation assembly 4 is provided with the limiting assembly 3. The limiting assembly 3 includes a rotating shaft 301, a limiting block 302, a driven flywheel 303, and a return spring 304. One end of the rotating shaft 301 is rotatably connected to the case 1, and another end of the rotating shaft 301 is rotatably connected to the bracket 402 and slidably moves up and down along a groove arranged on a side surface of the bracket 402. The return spring 304 and the driven flywheel 303 are arranged on the one end of the rotating shaft 301 connected to the case 1. The return spring 304 is located on an outer side of the driven flywheel 303. Each of two sides of the roller 503 is provided with the limiting block 302. In one embodiment, the limiting block 302 is a sector-shaped block a tail end of which is sleeved on the rotating shaft 301. In condition that a head end of the sector-shaped block moves to a high point, an upper portion of the sector-shaped block is located within a circumference of the film separation wheel 401, that is, a highest point of the sector-shaped is higher than a lowest point of the film separation wheel 401.

In the present embodiment, the supporting plate assembly 2 is correspondingly modified. The supporting plate assembly 2 includes a bearing plate 201, a rotating supporting plate 202 and a supporting spring 203. A lower end of the rotating supporting plate 202 extends into the case 1, and an upper end of the rotating supporting plate 202 is rotatably connected to the case 1. A middle portion of a front end of the rotating supporting plate 202 is connected to a front end of the bracket 402. The bearing plate 201 is fixed on a front end of the case 1. The supporting spring 203 is fixed below the rotating supporting plate 202. In one embodiment, the rotating supporting plate 202 includes a bottom plate 204 and two side baffles 205. A front end of an outer side of each side baffle is provided with a rotating block 206 rotatably connected to the case 1. The bottom plate 204 is elastically connected to the case 1 by the supporting spring 203. In the present embodiment, the driven flywheel 303 and the side baffle 205 are squeezably connected to a respective cam 504. For better distinction, in the present embodiment, each cam 504 includes a first cam 505 and a second cam 506. In condition that the first cam 505 rotates to a low point, the first cam 505 is squeezed and in contact with a respective driven flywheel 303. In condition that the second cam 506 rotates to the low point, the second cam 506 is squeezed and in contact with the side baffle 205. In the present embodiment, a laminating assembly 6 is installed inside the case 1. The laminating assembly 6 includes a transmission channel 601, a preheating assembly 602 and a film pressing assembly 603. Upper and lower sides of a head end of the transmission channel 601 are respectively provided with the preheating assembly 602. Upper and lower sides of a tail end of the transmission channel 601 are respectively provided with film pressing assembly 603. In one embodiment, a detection device 7 is installed between the input roller assembly 5 and the laminating assembly 6.

When the automatic laminating machine starts working, a plurality of films are placed on the bearing plate 201. The roller 503 is rotated driven by the rolling shaft 501. The second cam 506 is separated from the side baffle 205. The bottom plate 204 bounces upwards under the action of the supporting spring 203. The plurality of films on the bearing plate 201 are abutted against the roller 503. At the same time, the first cam 505 is separated from the driven flywheel 304. The rotating shaft 301 is rotated under the action of the return spring 304, thereby driving the limiting block 302 to rotate. The limiting block 302 no longer limits the films. The film separation assembly 4 rebounds under the action of the elastic member 403. The films are abutted against the roller 503 and the film separation wheel 401 on an upside and a downside, respectively, so that the film is driven to enter the laminating assembly 6, and the film separation wheel 401 is abutted against the lower films to prevent the lower films from entering the laminating assembly 6. When the rolling shaft 501 is rotated one cycle, the second cam 506 presses the side baffle 205 down. The bottom plate 204 is rotated about the rotating block 206 as an axis. The film separation wheel 401 moves downwards and the film is no longer in contact with the roller 503. A channel for enabling the film to continue to move is formed between the roller 503 and the film separation wheel 401. The second cam 506 and the side baffle 205 are squeezed and in contact with respect to each other, and stop moving. At the same time, the first cam 505 drives the driven flywheel 303 to move so as to drive the rotating shaft 301 to rotate; the limiting block 302 is rotated clockwise under the driving by the rotating shaft 301 and higher than the low point of the film separation wheel 401; and a front end of the limiting block 302 limits the lower film from entering the laminating assembly 6. The film passes through the preheating assembly 602, the transmission channel 601 and the film pressing assembly 603 of the laminating assembly 6 in sequence, thereby completing the sealing and being discharged out of the case 1. The film after completing sealing is detected by the detection assembly 7. The roller 503 is rotated again to perform the sealing of next film. Therefore, the automatic sealing of the film is completed.

It should be noted that the forgoing is merely illustrative of the embodiments of the present disclosure and the technical principles applied thereto. Any person skilled in the art should understand that the present disclosure is not limited to the specific embodiments described herein. Any person skilled in the art may make various apparent modification, readjustment and replacement, without departing from the protection scope of the present disclosure. Therefore, the present disclosure has been described in detail by the above embodiments, but is not limited to the above embodiments. Other equivalent embodiments may be included without departing from spirit and scope of the present disclosure, and the scope of the present disclosure is determined by the claims.

What is claimed is:

1. An automatic laminating machine, comprising a supporting plate assembly, a case, a limiting assembly, a film separation assembly, and an input roller assembly, wherein
   a lower end of the supporting plate assembly extends into and is rotatably connected inside the case; the limiting assembly and the input roller assembly are rotatably connected inside the case;
   the film separation assembly is arranged inside the case, and located below the input roller assembly; one end of the limiting assembly is rotatably connected to the supporting plate assembly; and
   the input roller assembly comprises a rolling shaft, a roller bracket, a roller, and two cams; two ends of the rolling shaft are rotatably connected to the case; the roller bracket is fixed on a middle part of the rolling shaft; the roller is sleeved on the roller bracket, and the two cams are fixed on the two ends of the rolling shaft, respectively.

2. The automatic laminating machine according to claim 1, wherein the film separation assembly comprises a film separation wheel, a bracket arranged on the case, and an elastic member; the film separation wheel is rotatably connected to the bracket which is arranged on the case, and located below the roller; the elastic member is fixed below the bracket which is arranged on the case.

3. The automatic laminating machine according to claim 1, wherein the limiting assembly comprises a rotating shaft, a limiting block, a driven flywheel, and a return spring; two ends of the rotating shaft are rotatably connected to an inner side wall of the case; the return spring and the driven flywheel are arranged on one of the two ends of the rotating shaft connected to the case, and the return spring is located on an outer side of the driven flywheel; two ends of the roller are respectively provided with the limiting block.

4. The automatic laminating machine according to claim 3, wherein the limiting block has a sectorial shape; a tail of the limiting block is sleeved on the rotating shaft; in condition that a head end of the limiting block moves to a high point, the head end of the limiting block is located within a circumference of a film separation wheel.

5. The automatic laminating machine according to claim 1, wherein the supporting plate assembly comprises a rotating supporting plate, a bearing plate, and a supporting spring; a lower end of the rotating supporting plate extends into the case, and an upper end of the rotating supporting plate is rotatably connected to the case; the bearing plate is fixed on a front end of the case, the supporting spring is fixed below the rotating supporting plate.

6. The automatic laminating machine according to claim 5, wherein the rotating supporting plate comprises a bottom plate and two side baffles, a front end of an outer side of each said side baffle is provided with a rotating block rotatably connected to the case; the bottom plate is elastically connected to the case through the supporting spring.

7. The automatic laminating machine according to claim 1, wherein each of the two cams comprises a first cam and a second cam; in condition that the first cam is rotated to a low point, the first cam is squeezed and in contact with a driven flywheel; and in condition that the second cam is rotated to the low point, the second cam is squeezed and in contact with a side baffle.

8. The automatic laminating machine according to claim 1, wherein a laminating assembly is arranged inside the case; the laminating assembly comprises a transmission channel, a preheating assembly, and a film pressing assembly; upper and lower sides of a front end of the transmission channel are respectively provided with the preheating assembly; upper and lower sides of a tail end of the transmission channel are respectively provided with the film pressing assembly.

\* \* \* \* \*